(12) United States Patent
Kopikare et al.

(10) Patent No.: US 9,324,105 B2
(45) Date of Patent: Apr. 26, 2016

(54) METHOD AND APPARATUS TO BUY AND SELL ITEMS VIA A LOCAL AREA NETWORK

(71) Applicant: Marvell World Trade Ltd., St. Michael (BB)

(72) Inventors: Milind Kopikare, Sunnyvale, CA (US); Rahul Kopikare, Mumbai (IN); Aswath Mohan, Bellevue, WA (US)

(73) Assignee: Marvell World Trade Ltd., St. Michael (BB)

(*) Notice: Subject to any disclaimer, the term of this patent is extended or adjusted under 35 U.S.C. 154(b) by 0 days.

(21) Appl. No.: 14/677,844

(22) Filed: Apr. 2, 2015

(65) Prior Publication Data

US 2015/0221018 A1    Aug. 6, 2015

Related U.S. Application Data

(63) Continuation of application No. 13/608,638, filed on Sep. 10, 2012, which is a continuation of application No. 11/840,557, filed on Aug. 17, 2007, now Pat. No. 8,265,621.

(60) Provisional application No. 60/823,840, filed on Aug. 29, 2006.

(51) Int. Cl.
| | |
|---|---|
| *H04W 4/00* | (2009.01) |
| *H04W 24/00* | (2009.01) |
| *G06Q 30/06* | (2012.01) |
| *H04W 8/00* | (2009.01) |
| *H04L 29/08* | (2006.01) |
| *H04W 8/18* | (2009.01) |

(52) U.S. Cl.
CPC ............ *G06Q 30/0633* (2013.01); *H04L 67/16* (2013.01); *H04L 67/303* (2013.01); *H04W 8/005* (2013.01); *H04W 8/18* (2013.01)

(58) Field of Classification Search
CPC ............................... H04W 84/14; H04W 92/02
USPC ....................................................... 455/426.2
See application file for complete search history.

(56) References Cited

U.S. PATENT DOCUMENTS

| | | |
|---|---|---|
| 6,512,919 B2 | 1/2003 | Ogasawara |
| 6,925,307 B1 | 8/2005 | Mamdani et al. |
| 7,027,801 B1 | 4/2006 | Hall et al. |

(Continued)

OTHER PUBLICATIONS

"802.11—1999 Standard for LAN/MAN—Specific Requirements—Part 11: Wireless LAN Medium Access Control (MAC) and Physical Layer (PHY) Specifications", Institute of Electrical and Electronics Engineers (IEEE), 1999, 531 pages.

(Continued)

*Primary Examiner* — Lester Kincaid
*Assistant Examiner* — Andy Gu

(57) ABSTRACT

A wireless device capable of matching a user with content based on the user's proximity to other users, by searching for a match between profiles of wireless devices within a wireless coverage area. Wireless devices broadcast profiles within a wireless coverage area. Other wireless devices within the wireless coverage area receive the broadcasted profiles, determine a match between the received profile and a profile stored on the wireless device, and display a match indicator if a match is determined. In this manner, a user having a wireless device may be matched with content based on the user's proximity to other users.

20 Claims, 8 Drawing Sheets

(56) References Cited

U.S. PATENT DOCUMENTS

| | | |
|---|---|---|
| 7,389,534 B1 | 6/2008 | He |
| 7,859,560 B1 | 12/2010 | Issa |
| 7,870,053 B1 | 1/2011 | Bergman et al. |
| 2001/0014878 A1* | 8/2001 | Mitra et al. .................... 705/39 |
| 2003/0036985 A1 | 2/2003 | Soderholm |
| 2003/0182428 A1 | 9/2003 | Li et al. |
| 2004/0048605 A1* | 3/2004 | Schaefer et al. ........... 455/414.2 |
| 2004/0120298 A1 | 6/2004 | Evans et al. |
| 2004/0254855 A1 | 12/2004 | Shah |
| 2005/0044014 A1* | 2/2005 | Tilis et al. ...................... 705/30 |
| 2005/0048961 A1 | 3/2005 | Ribaudo et al. |
| 2005/0251807 A1 | 11/2005 | Weel |
| 2005/0267812 A1 | 12/2005 | Jensen et al. |
| 2005/0289039 A1 | 12/2005 | Greak |
| 2006/0002331 A1 | 1/2006 | Bhagwat et al. |
| 2006/0075075 A1 | 4/2006 | Malinen et al. |
| 2006/0126554 A1 | 6/2006 | Motegi et al. |
| 2007/0078722 A1 | 4/2007 | Saxena et al. |
| 2007/0177554 A1* | 8/2007 | Yang et al. ..................... 370/338 |
| 2008/0056215 A1 | 3/2008 | Kopikare et al. |

OTHER PUBLICATIONS

"802.15.1—2002 Standard for LAN/MAN—Specific Requirements—Part 15.1: Wireless Medium Access Control (MAC) and Physical Layer (PHY) Specifications for Wireless Personal Area Networks {WPANs}", Institute of Electrical and Electronics Engineers (IEEE), 1999, 1168 pages.

PCT International Search Report in corresponding International Application No. PCT/US07/77024, dated Mar. 3, 2008.

Written Opinion of the International Searching Authority in corresponding International Application No. PCT/US07/77024, dated Mar. 3, 2008.

* cited by examiner

METHOD AND APPARATUS TO BUY AND SELL ITEMS VIA A LOCAL AREA NETWORK

CROSS-REFERENCE TO RELATED APPLICATIONS

The present disclosure is a continuation of U.S. patent application Ser. No. 13/608,638, filed Sep. 10, 2012, which is a continuation of and claims priority to U.S. patent application Ser. No. 11/840,557, filed Aug. 17, 2007, now U.S. Pat. No. 8,265,621, issued Sep. 11, 2012, which claims priority to U.S. Provisional Patent Application No. 60/823,840, filed Aug. 29, 2006, which are incorporated herein by reference.

BACKGROUND

1. Field of the Invention

The invention relates to wireless networking, and more specifically, to searching for a match between profiles of wireless devices within a vicinity of a wireless coverage area.

2. Description of the Related Art

There are a variety of on-line services that match users with targeted content using profiles. Users of these on-line services create profiles for interacting with an on-line service. The on-line services store profiles containing attributes of each piece of content. When a user is logged onto an on-line service, the service may match the information stored in the user's profile with attributes of the available content, so as to provide the user with targeted content. Examples of on-line services include social networking services such as MySpace™ and Linked-In™, advertising services such as Google™, shopping services such as Amazon™, classifieds services such as Craig's List™ and E-Bay™, game services such as Xbox Live™, and media distribution services such as iTunes™ and BitTorrent™.

Presently, these on-line services may not match a user with content based on the user's interest in receiving such content and also based on the user's proximity to other users. For example, on-line services may not provide a user with information about nearby users with matching interests, or information relating to items of interest in a store where the user is currently located while shopping.

SUMMARY OF THE INVENTION

The present invention addresses the foregoing by searching for a match between profiles of wireless devices within a wireless coverage area. The invention receives profiles broadcasted by wireless devices within the same wireless coverage area as a user, and determines a match between received profiles and the user's profile. If a match is determined, the invention displays a match indicator.

The invention may be implemented by a wireless device, a method for operating the wireless device, a computer program that operates in accordance with the method, and a computer-readable medium storing the computer program. The wireless device searches for a match between profiles of wireless devices within a wireless coverage area. The wireless device receives profiles broadcasted by other wireless devices within the wireless coverage area. A determination is made as to whether there is a match between a received profile and a profile stored on the wireless device, and if so, a match indicator is displayed.

Thus, the present invention matches a user with content based on the user's proximity to other users. Here, "proximity" may be determined by the range and connectivity of the wireless coverage area, but proximity can also be determined in other ways, if desired. For example, a person using the present invention may receive information about nearby users with matching interests, or information relating to a store where the user is shopping.

In another aspect of the invention, the wireless device broadcasts one or more profiles within the wireless coverage area.

In another aspect of the invention, the wireless coverage area is a WiFi coverage area and at least one of the one or more profiles is broadcasted in a beacon. The beacon comprises a WiFi information element, and a profile is stored within the information element. The beacon includes WiFi beacon frames and WiFi probe response frames.

In another aspect of the invention, the broadcasting is performed using WiFi beacons by adding the profile to a beacon, and extracting a profile from a beacon on the recipient side.

In another aspect of the invention the device includes cellular phones, laptops, and special purpose wireless devices. Special purpose wireless devices include a universal serial bus (USB) interface, an embedded wireless system, and a display. The device can process one or more applications In another aspect, the invention is a social networking application. A determination as to whether there is a match between personal profiles is made by comparing personal preferences and attributes of one personal profile with personal preferences and attributes of another personal profile. Devices may connect via a network connection, exchange information via a network connection, create a chat session via a network connection, and store profiles. The match indicator includes text messages, icons, and personal profile information.

In another aspect, the invention is a classifieds application. A determination as to whether there is a match between a seller profile and a buyer profile is made by comparing the list of items for sale in the seller profile with the list of wanted items in the buyer profile. Devices may connect via a network connection, exchange information via a network connection, create a chat session via a network connection, and store profiles. The match indicator includes text messages, icons, information about items for sale, and information about a seller.

In another aspect, the invention is a shopping application. A determination as to whether there is a match between a product profile and a shopping profile is made by comparing the product ID's in the product profile with the product ID's in the shopping profile. The match indicator includes text messages, icons, information about products, information about discounts, and advertisements.

In another aspect, the invention is a game application. A determination as to whether there is a match between game profiles is made by comparing the list of games of one game profile with the list of games of another game profile. Devices may connect via a network connection, exchange information via a network connection, create a chat session via a network connection, and store profiles. The match indicator includes text messages, icons, and a list of matching games.

In another aspect, the invention is a media distribution application. A determination as to whether there is a match between media profiles is made by comparing lists of files available for download with lists of files wanted. Devices may connect via a network connection, exchange information via a network connection, and create a chat session via a network connection. The match indicator includes text messages, icons, a list of files downloadable from another device, and a list of files requested by another device.

As an example, a user may store a profile for an on-line service onto a wireless device before entering a wireless coverage area, such as a building, bus, store, or the like. The user's wireless device receives profiles corresponding to content provided by the online service, broadcasted by nearby wireless devices within the wireless coverage area. The user's wireless device determines a match between the user's profile and the content's profile. If the user's wireless device determines a match, the user's wireless device displays a match indicator. In this manner, the user is matched with content based on the user's proximity to other users, such as information about nearby users with matching interests, information relating to a store where the user is shopping, or the like.

This brief summary has been provided so that the nature of the invention may be understood quickly. A more complete understanding of the invention can be obtained by reference to the following detailed description, appended claims, and accompanying drawings.

DETAILED DESCRIPTION

First Embodiment

Figure 1:
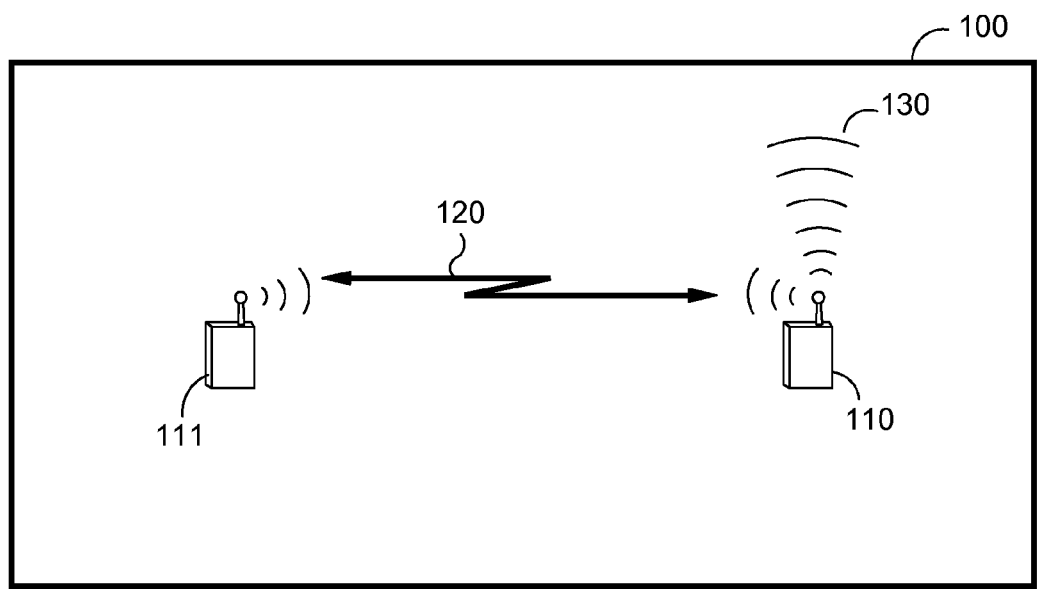
FIG. 1 is a network diagram depicting wireless devices in a wireless coverage area in accordance with a first embodiment of the invention.
Figure 1:
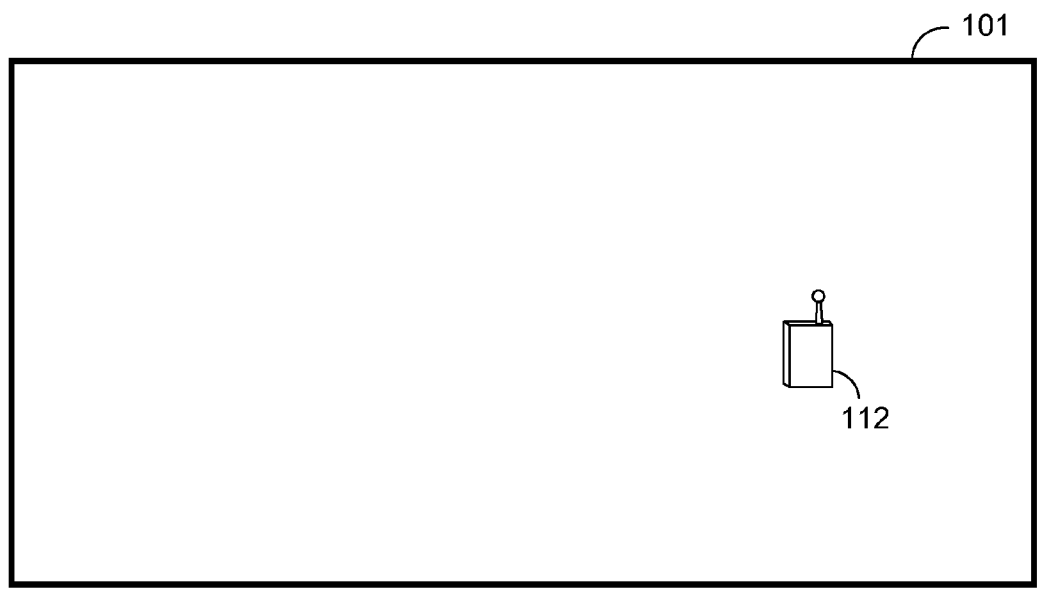

FIG. 1 is a network diagram depicting wireless devices in a wireless coverage area in accordance with an exemplary embodiment of the invention. Wireless coverage areas 100 and 101 are regions covered by a wireless local area network (WLAN) client, such as wireless devices 110, 111, and 112 or by a group of access points (not shown) connected to each other. The particular geographical location of wireless coverage areas 100 and 101 are defined by the transmission and reception ranges of the wireless devices within the wireless coverage area, such as wireless devices 110, 111, and 112. A typical wireless coverage area is a bus, building, store or the like.

Wireless devices 110, 111, and 112 are devices equipped with wireless radio transceivers for communication on a wireless local area network, or WLAN, for example wireless devices that operate in accordance with the WiFi (IEEE 802.11) protocol, Bluetooth (IEEE 802.15), or the like. Examples include cellular phones, laptops, special purpose wireless devices, or the like. A special purpose wireless device may be, for example, a Universal Serial Bus (USB) flash drive with an embedded wireless system and a display.

Figure 2:
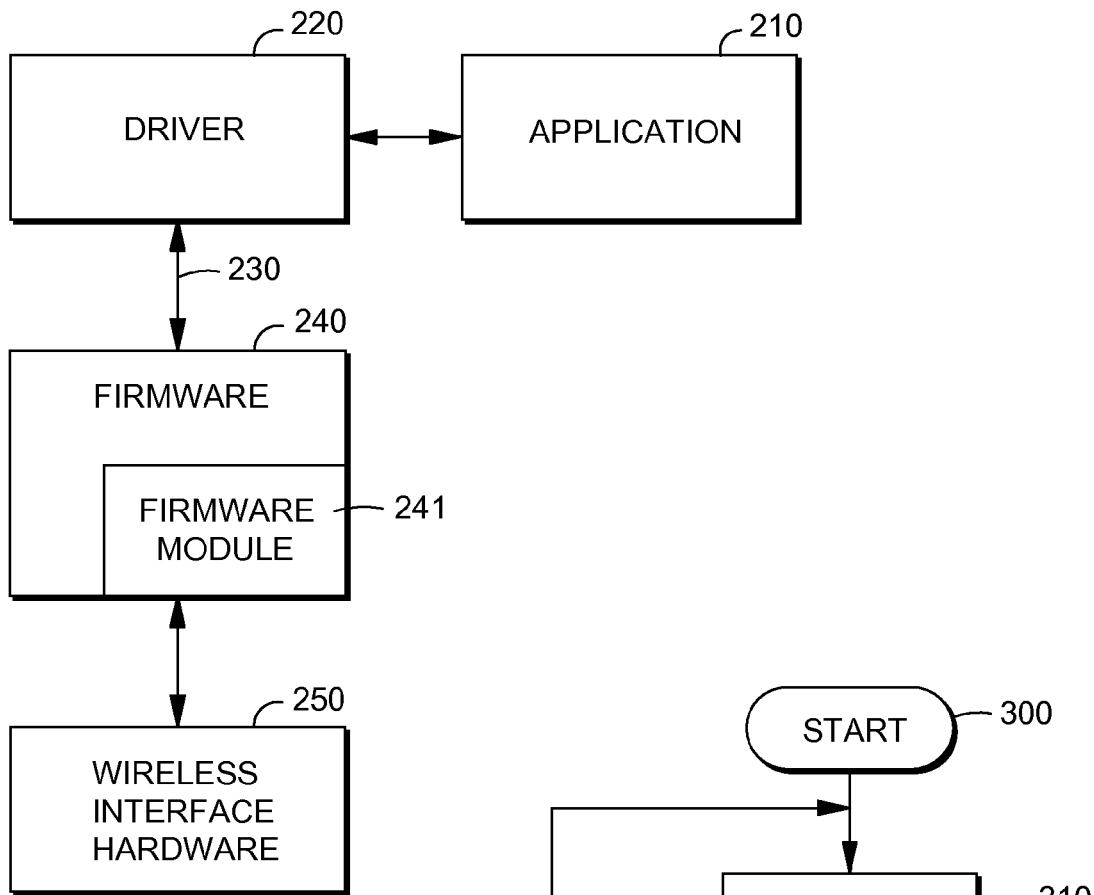
FIG. 2 is a functional block diagram showing functional modules of a wireless device in accordance with the first embodiment of the invention.

Users can transfer their profiles to wireless devices 110, 111, and 112 from the Internet using network interface hardware, such as wireless interface hardware 250 of FIG. 2, Ethernet interface hardware, or any other suitable network interface hardware. Also, users can transfer a profile stored on another device, such as a computer, to their wireless device using, for example, a Universal Serial Bus (USB) interface, Bluetooth interface, or the like.

In this first embodiment, wireless devices communicate using WiFi, but this should not be viewed as a limitation of this invention. Wireless devices 110, 111, and 112 have wireless interface hardware, such as wireless interface hardware 250 of FIG. 2, and corresponding logic for the WiFi protocol, such as software or firmware 240 of FIG. 2. The firmware of wireless devices 110, 111, and 112 contains a module that adds additional functionality to the WiFi protocol, such as firmware module 241 of FIG. 2. The module adds functionality for adding profiles to information elements of broadcasted WiFi beacon frames or WiFi probe response frames. The module also adds functionality for extracting profiles from received WiFi beacon frames or WiFi probe response frames.

Wireless network connection 120 is a WiFi network connection between wireless devices 110 and 111. Beacon 130 is a WiFi beacon frame or a WiFi probe response frame. Because the transmission ranges of WiFi beacon frames and WiFi probe response frames are limited, beacon 130 may only be received by nearby wireless devices.

In this embodiment, one way to determine nearby wireless devices is presence within a peer-to-peer WiFi network. Such networks do not rely on network infrastructure, such as access points, and can function without a network infrastructure. Wireless devices within a wireless coverage area may form peer-to-peer WiFi networks. By virtue of the fact that peer-to-peer WiFi transmissions have a limited range, a wireless device's presence within a peer-to-peer WiFi network may indicate to other wireless devices that the wireless device is nearby.

Wireless device 110 advertises a stored profile by continuously broadcasting beacon 130 containing the stored profile in an information element. Because wireless device 111 is within the same wireless coverage area as wireless device 110, namely wireless coverage area 100, wireless device 111 receives beacon 130 containing the profile advertised by wireless device 110. Because wireless device 112 is not within wireless coverage area 100, wireless device 112 does not receive the profile advertised by wireless device 110. Therefore, wireless device 112 does not discover wireless device 110's presence.

Upon receiving beacon 130, wireless device 111 extracts the advertised profile from beacon 130, and determines a match between the advertised profile and a profile stored on wireless device 111. If there is a match, wireless device 111 displays a match indicator, such as a text message, an icon, the content of the received profile, a portion of the received profile, or the like. A user of wireless device 111 can then choose to create a wireless network connection, such as wireless network connection 120, for exchanging information with wireless device 110.

FIG. 2 is a functional block diagram showing functional modules of a wireless device in accordance this first embodiment of the invention. Application 210 is an application for accessing services that provide targeted content based on profiles. For example, application 210 may be an application for a social networking service, an advertising service, a classifieds service, a comparative shopping service, a media distribution service, or the like. Application 210 may run on an operating system such as Windows, Windows Mobile, Java, Palm OS, a proprietary operating system, or any other suitable operating system for running applications on a wireless device. Driver 220 is an operating system driver that is part of an operating system running on the wireless device. Driver 220 allows application 210 to interface with wireless interface hardware 250, via firmware application programming interface (API) 230, firmware 240, and firmware module 241.

Wireless interface hardware 250 may be a removable wireless interface card or a wireless interface chip embedded in a laptop, cell phone, or the like. Wireless interface hardware 250 transmits and receives information between other wireless devices using the WiFi protocol. Firmware 240 is a set of instructions stored on a memory of wireless interface hardware 250. Firmware 240 contains instructions for transmitting and receiving information between other wireless devices through wireless interface hardware 250 using the WiFi protocol. Firmware 240 contains firmware module 241. Firmware module 241 is a set of additional instructions that adds additional functionality to the WiFi protocol. Firmware module 241 adds functionality for adding profiles to information elements of broadcasted WiFi beacon frames or WiFi probe response frames. Firmware module 241 also adds functionality for extracting profiles from received WiFi beacon frames or WiFi probe response frames.

To advertise a profile, application 210 uses driver 220 to send the profile to firmware module 241, via firmware API 230. Firmware module 241 then generates a beacon, which may be a WiFi beacon frame or a WiFi probe frame, containing the profile in an information element. After the beacon is generated, firmware module 241 sends a command to wireless interface hardware 250 for broadcasting the beacon at regular intervals.

To receive a profile from another wireless device, firmware module 241 extracts a profile from a WiFi beacon frame or a WiFi probe response frame received by wireless interface hardware 250, and sends the extracted profile to application 210 via firmware API 230 and driver 220. Because the transmission range of wireless devices using the WiFi protocol is limited, wireless interface hardware 250 may only receive WiFi beacon frames or WiFi probe response frames transmitted from nearby wireless devices.

Application 210 then determines whether a match exists between a stored profile and the received profile, and displays a match indication if there is a match. Application 210 determines a match by comparing keywords in the received profile with keywords in the stored profile.

If there is a match between profiles, application 210 may issue a command to firmware 240 for creating a WiFi connection between the wireless device and the wireless device that advertised the received profile.

Figure 3:
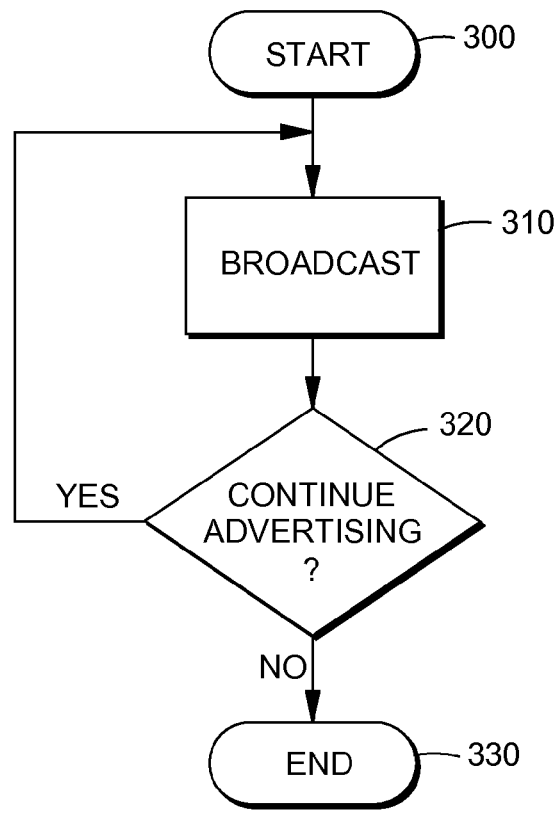
FIG. 3 is a flowchart depicting a process of advertising a profile in accordance with the first embodiment of the invention.

FIG. 3 is a flowchart depicting a process for advertising a profile in accordance with this first embodiment of the invention. In block 300, a wireless device, such as the wireless device described in FIG. 2, processes a command to advertise the profile. Processing proceeds to block 310 where the wireless device broadcasts a beacon containing the profile. Processing then proceeds to block 320 where the wireless device determines whether it should continue advertising the profile. If the wireless device determines that it should continue advertising the profile, processing returns to block 310 where the wireless device broadcasts the beacon again. This process continues until the wireless device determines in block 320 that it should not continue advertising the profile, in which case processing proceeds to block 330 and ends.

Figure 4:
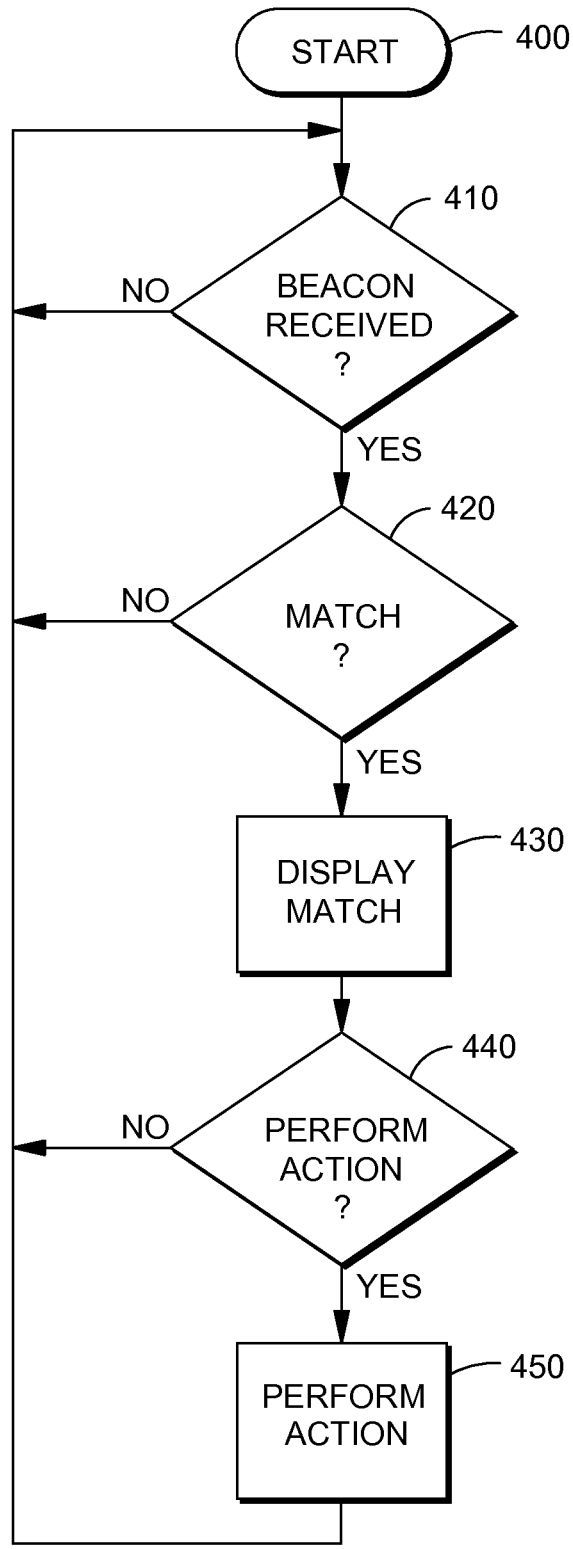
FIG. 4 is a flowchart depicting a process of receiving a profile in accordance with the first embodiment of the invention.

FIG. 4 is a flowchart depicting a process for receiving a profile in accordance with this first embodiment of the invention. In block 400, a wireless device, such as the wireless device described in FIG. 2, processes a command to listen for beacons that may contain profiles. Processing proceeds to block 410 where the wireless device determines whether it has received a beacon. If the wireless device has not received a beacon, processing returns to block 410 where the wireless device again determines whether it has received a beacon. This process continues until the wireless device determines in block 410 that it has received a beacon, in which case processing proceeds to block 420.

In block 420, the wireless device determines whether a profile contained in the received beacon matches a profile stored on the wireless device. If the wireless device determines that there is no match between the two profiles, processing returns to block 410 where the wireless device continues listening for received beacons.

If the wireless device determines that there is a match between the two profiles, processing proceeds to block 430 where the wireless device displays a match indication. Processing then proceeds to block 440 where, the wireless device determines whether it should perform an action. If the wireless device determines that it should not perform an action, processing returns to block 410 where the wireless device continues listening for received beacons.

If the wireless device determines that it should perform an action, processing proceeds to block 450 where the wireless device performs an action. After the wireless device has performed the action, processing returns to block 410 where the wireless device continues listening for received beacons.

Second Embodiment

Figure 5:
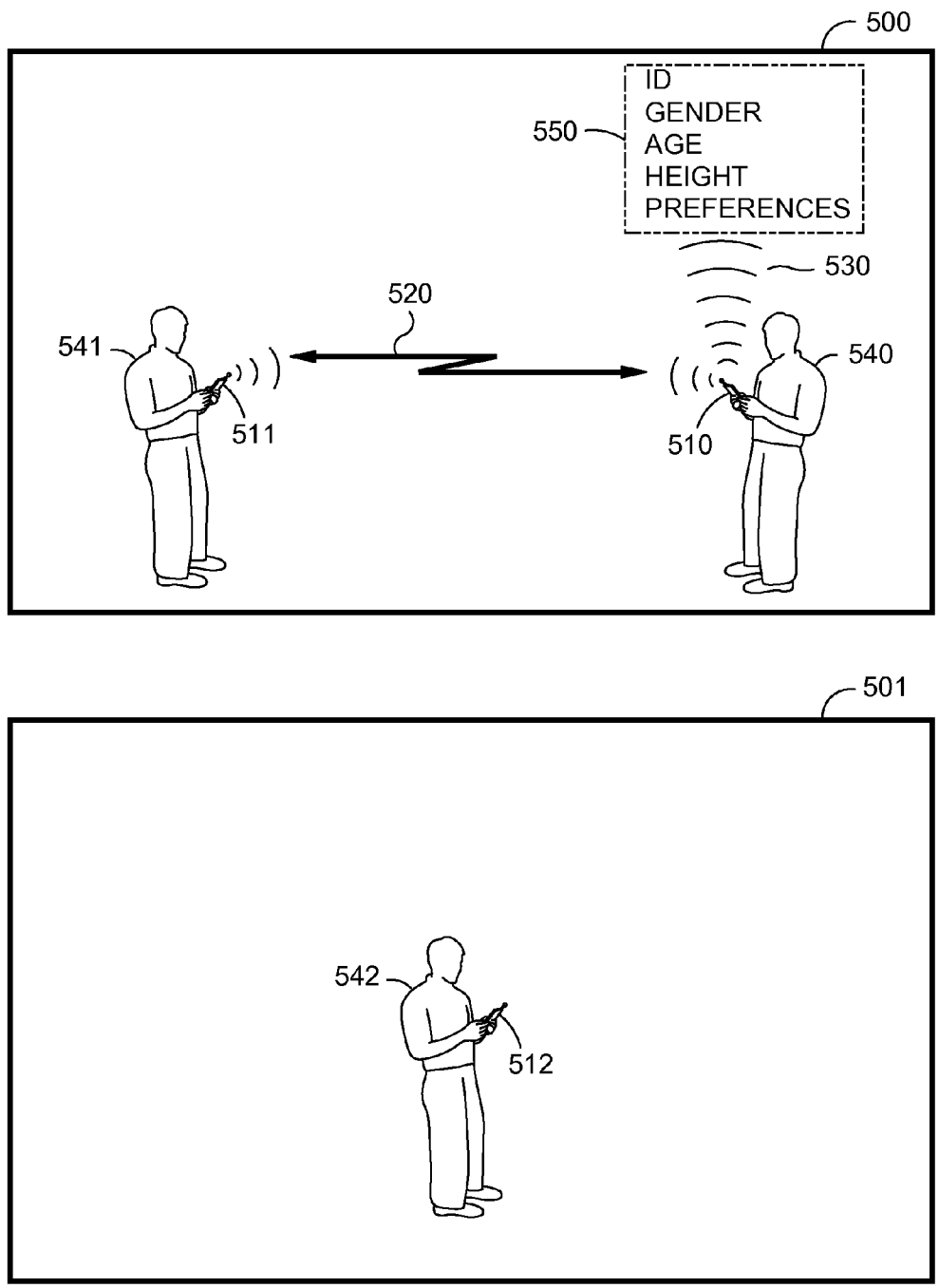
FIG. 5 is a network diagram depicting wireless devices in a wireless coverage area, configured for providing a social networking service, in accordance with a second embodiment of the invention.

FIG. 5 is a network diagram depicting wireless devices in a wireless coverage area, configured for providing a social networking service, in accordance with a second embodiment of the invention. Wireless coverage areas 500 and 501 are similar to wireless coverage areas 100 and 101 shown in FIG. 1. The particular geographical location of wireless coverage areas 500 and 501 are defined by the transmission and reception ranges of the wireless devices within the wireless coverage area, such as wireless devices 510, 511, and 512. A typical wireless coverage area is a bus, building, store or the like.

Wireless devices 510, 511, and 512 are wireless devices similar to wireless devices 110, 111, and 112 shown in FIG. 1. Wireless network connection 520 is similar to wireless network connection 120 of FIG. 1. Beacon 530 is a WiFi beacon frame or a WiFi probe response frame. Because the transmission ranges of WiFi beacon frames and WiFi probe response frames are limited, beacon 530 may only be received by nearby wireless devices.

Users 540, 541, and 542 are users of an on-line social networking service, such as Yahoo! Personals™, Match.com™, MySpace™, Linked-In, Facebook™, or the like, and have each stored a copy of their on-line personal profile onto wireless devices 510, 511, and 512, respectively. Neither user 540, 541, nor 542 is logged onto the Internet. The personal profiles of users 540, 541, and 542, such as personal profile 550, contain personal preferences and attributes. Attributes may be the user's on-line ID, age, gender, height, pictures, and the like. Personal preferences may be dating preferences, interests, and the like.

In this embodiment, the proximity of users is determined by the presence of users within a WiFi coverage area, such as wireless coverage areas 500 and 501. Users 540 and 541 are nearby since they are in the same wireless coverage area, namely wireless coverage area 500. User 542 is not near users 540 and 541 since user 542 is in another wireless coverage area, namely wireless coverage area 501.

User 540 advertises personal profile 550, stored on wireless device 510, by continuously broadcasting beacon 530, which contains personal profile 550 in an information element. User 540 may either advertise all the information in personal profile 550 or some of the information in personal profile 550. Because wireless device 511 is within the same wireless coverage area as wireless device 510, namely wireless coverage area 500, wireless device 511 receives beacon 530 containing personal profile 550. Because wireless device 512 is not within wireless coverage area 500, wireless device 512 does not receive personal profile 550. Therefore, user 542 does not discover user 540's presence.

Upon receiving beacon 530, wireless device 511 extracts personal profile 550 from beacon 530, and determines a match between personal profile 550 and user 541's stored personal profile. Wireless device 511 determines a match by comparing the personal preferences and attributes of personal profile 550 with the personal preferences and attributes of user 541's personal profile, in the same manner that the on-line service would match the two personal profiles if users 540 and 541 were logged onto the Internet. If there is a match, wireless device 511 displays a match indicator, such as a text message, an icon, the content of personal profile 550, a portion of personal profile 550, or the like. Upon noticing the match indicator, user 541 may perform an action.

For example, if personal profile 550 contains enough information, user 541 may identify user 540 within wireless coverage area 500 and meet user 540 in person. User 541 may also advertise user 541's personal profile to allow user 540 to identify user 541. Additionally, user 541 may create a wireless network connection, such as wireless network connection 520, between wireless devices 510 and 511 so that users 540 and 541 can exchange additional information or start a chat session. Finally, user 541 may store personal profile 550 on wireless device 511 so that user 541 can log onto the Internet later and communicate with user 540 using the on-line service.

Third Embodiment

Figure 6:
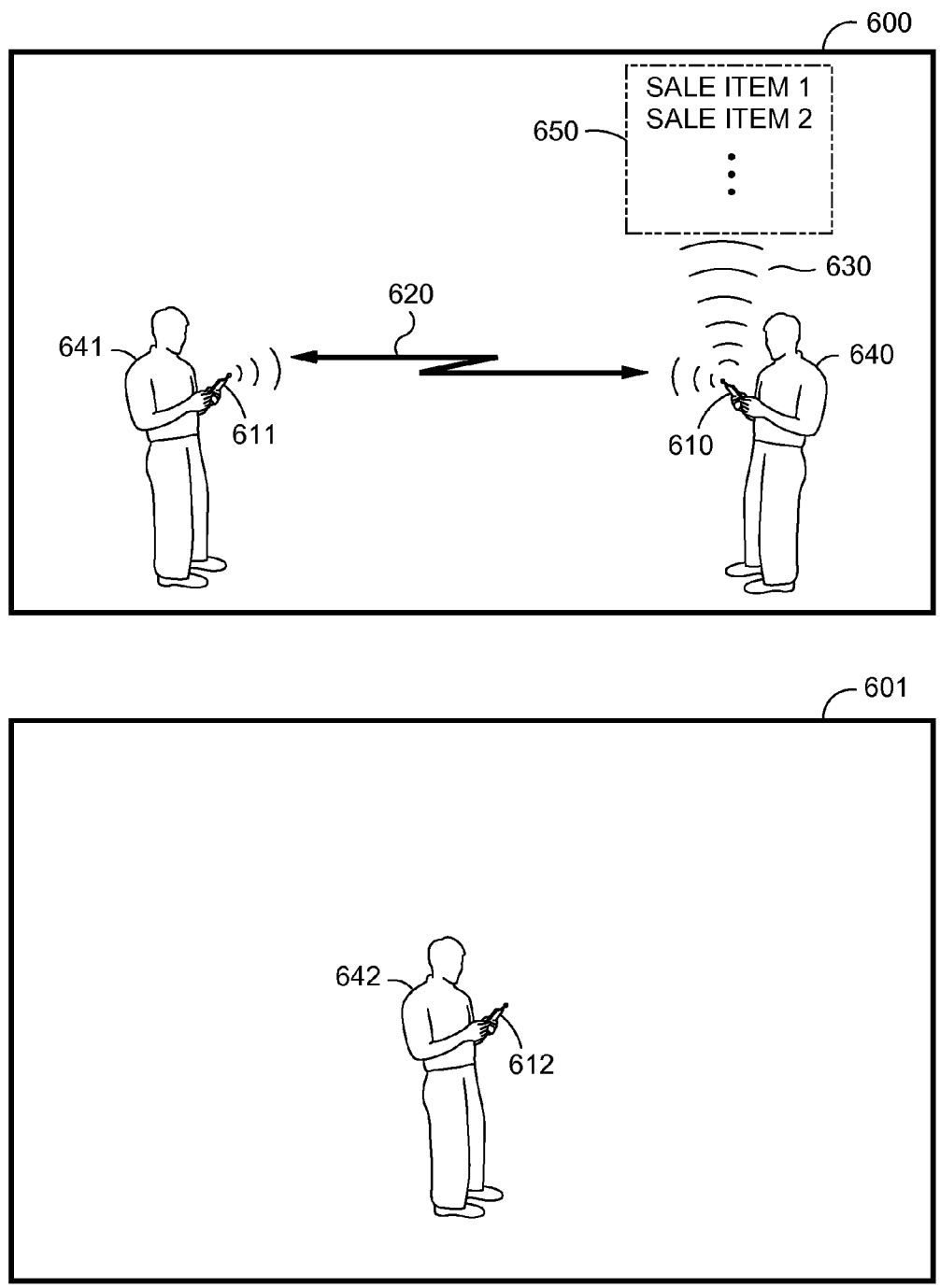
FIG. 6 is a network diagram depicting wireless devices in a wireless coverage area, configured for providing a classifieds service, in accordance with a third embodiment of the invention.

FIG. 6 is a network diagram depicting wireless devices in a wireless coverage area, configured for providing a classifieds service, in accordance with a third embodiment of the invention. Wireless coverage areas 600 and 601 are similar to wireless coverage areas 100 and 101 shown in FIG. 1. The particular geographical location of wireless coverage areas 600 and 601 are defined by the transmission and reception ranges of the wireless devices within the wireless coverage area, such as wireless devices 610, 611, and 612. A typical wireless coverage area is a bus, building, store or the like.

Wireless devices 610, 611, and 612 are wireless devices similar to wireless devices 110, 111, and 112 shown in FIG. 1. Wireless network connection 620 is similar to wireless network connection 120 of FIG. 1. Beacon 630 is a WiFi beacon frame or a WiFi probe response frame. Because the transmission ranges of WiFi beacon frames and WiFi probe response frames are limited, beacon 630 may only be received by nearby wireless devices.

Users 640, 641, and 642 are users of an on-line classifieds service, such as Craig's List™, E-Bay™, or the like. User 640 has stored a copy of user 640's on-line seller profile onto wireless device 610. User 640's seller profile 650 contains attributes about the items user 640 is selling on the on-line classifieds service. Users 641 and 642 have stored a copy of their on-line buyer profiles onto wireless devices 611 and 612, respectively. These buyer profiles contain attributes about the items users 641 and 642 want to buy. Additionally, these buyer profiles may contain purchasing information, such as an E-Bay™ ID, PayPal™ ID, credit card number, and the like, for users 641 and 642. Neither user 640, 641, nor 642 is logged onto the Internet.

In this embodiment, the proximity of users is determined by the presence of users within a WiFi coverage area, such as wireless coverage areas 600 and 601. Users 640 and 641 are nearby since they are in the same wireless coverage area, namely wireless coverage area 600. User 642 is not near users 640 and 641 since user 642 is in another wireless coverage area, namely wireless coverage area 601.

User 640 advertises seller profile 650 stored on wireless device 610 by continuously broadcasting beacon 630, which contains seller profile 650 in an information element. User 640 may either advertise all the information in seller profile 650 or some of the information in seller profile 650. Because wireless device 611 is within the same wireless coverage area as wireless device 610, namely wireless coverage area 600, wireless device 611 receives beacon 630 containing seller profile 650. Because wireless device 612 is not within wireless coverage area 600, wireless device 612 does not receive seller profile 650. Therefore, user 642 is not aware of the items user 640's is selling.

Upon receiving beacon 630, wireless device 611 extracts seller profile 650 from beacon 630, and determines a match between the items listed for sale in seller profile 650 and the wanted items listed in user 641's buyer profile. If there is a match, wireless device 611 displays a match indicator, such as a text message, an icon, information about the matching items for sale by user 640, information about user 640, and the like. Upon noticing the match indicator, user 641 may perform an action.

For example, if seller profile 650 contains enough information, user 641 may identify user 640 within wireless coverage area 600 and meet user 640 in person. User 641 may also advertise user 641's buyer profile to indicate user 641's interest to buy and/or allow user 640 to identify user 641. Additionally, user 641 may create a wireless network connection, such as wireless network connection 620, between wireless devices 610 and 611, so that users 640 and 641 can exchange additional information or start a chat session. Finally, user 641 may store seller profile 650 on wireless device 611 so that user 641 can log onto the Internet later and complete the sale with user 640 using the on-line service.

Fourth Embodiment

Figure 7:
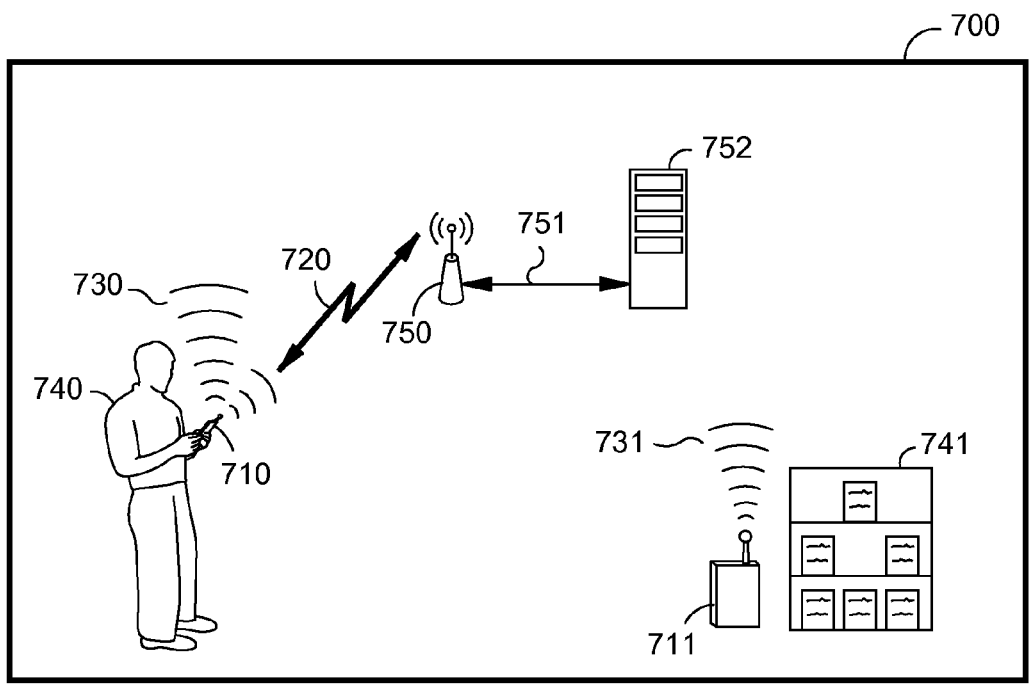
FIG. 7 is a network diagram depicting wireless devices in a wireless coverage area, configured for providing a shopping service, in accordance with a fourth embodiment of the invention.

FIG. 7 is a network diagram depicting wireless devices in a wireless coverage area, configured for providing a shopping service, in accordance with a fourth embodiment of the invention. Wireless coverage area 700 is similar to wireless coverage areas 100 and 101 shown in FIG. 1. The particular geographical location of wireless coverage area 700 is defined by the transmission and reception ranges of the wireless devices within the wireless coverage area, such as wireless devices 710, 711, and access point 750. A typical wireless coverage area is a bus, building, store or the like Wireless devices 710 and 711 are wireless devices similar to wireless devices 110, 111, and 112 shown in FIG. 1. Wireless network connection 720 is similar to wireless network connection 120 of FIG. 1. Beacons 730 and 731 are WiFi beacon frames or WiFi probe response frames. Because the transmission ranges of WiFi beacon frames and WiFi probe response frames are limited, beacons 730 and 731 may only be received by nearby wireless devices.

Product display 741 is a display unit displaying items for sale in a store. A product profile containing information about the products displayed by product display 741, such as a product ID, price, product specifications, and the like, is stored on wireless device 711.

User 740 is a user of an on-line shopping service for receiving product information and discounts. User 740 has stored a copy of user 740's on-line shopping profile onto wireless device 710. User 740's shopping profile may contain attributes about items user 740 wants to buy, such as product ID's and desired prices, user 740's shopping history, coupons, and the like. User 740 is not logged onto the Internet.

Access point 750 is a wireless device that connects wireless local area network (WLAN) clients, such as wireless devices 710 and 711, to shopping server 752 via local area network connection 751. Shopping server 752 hosts a comparative shopping service for providing targeted advertisements and discounts to a user based upon the user's shopping profile.

In this embodiment, the proximity of users is determined by the presence of users within a WiFi coverage area, such as wireless coverage area 700. Here, wireless coverage area 700 is a store, and product display 741 and shopping server 752 are users whose presence within the store may be detected by other users, such as user 740.

User 740, product display 741, and access point 750 are nearby since they are all inside the same store. User 740 advertises the shopping profile stored on wireless device 710 by continuously broadcasting beacon 730, containing the stored shopping profile in an information element. User 740 may either advertise all the information in the profile or some of the information in the profile. Because access point 750 is within the same wireless coverage area as wireless device 710, namely wireless coverage area 700, access point 750 receives beacon 730 containing the shopping profile advertised by user 740.

Upon receiving beacon 730, access point 750 extracts the advertised shopping profile from beacon 730, and forwards the shopping profile to shopping server 752. Shopping server 752 determines a match between the items listed in user 740's shopping profile and targeted advertisements and discounts available from the store. If there is a match, shopping server 752 may create wireless network connection 720, connecting shopping server 752 and wireless device 710, via access point 750, and send wireless device 710 targeted advertisements and discounts. Wireless device 710 then displays the targeted advertisements and discounts and user 740 can use this information while shopping in the store.

Product display 741 advertises the product profile stored on wireless device 711 by continuously broadcasting beacon 731 containing the stored product profile in an information element. Because wireless device 710 is within the same wireless coverage area as wireless device 711, namely wireless coverage area 700, wireless device 710 receives beacon 731 containing the product profile advertised by product display 741.

Upon receiving beacon 731, wireless device 710 extracts the advertised product profile from beacon 731, and determines a match between product ID's listed in the product profile and the product ID's listed in user 740's shopping profile. If there is a match, wireless device 710 displays a match indicator, such as a text message, an icon, information about the items displayed by product display 741, or the like.

Fifth Embodiment

Figure 8:
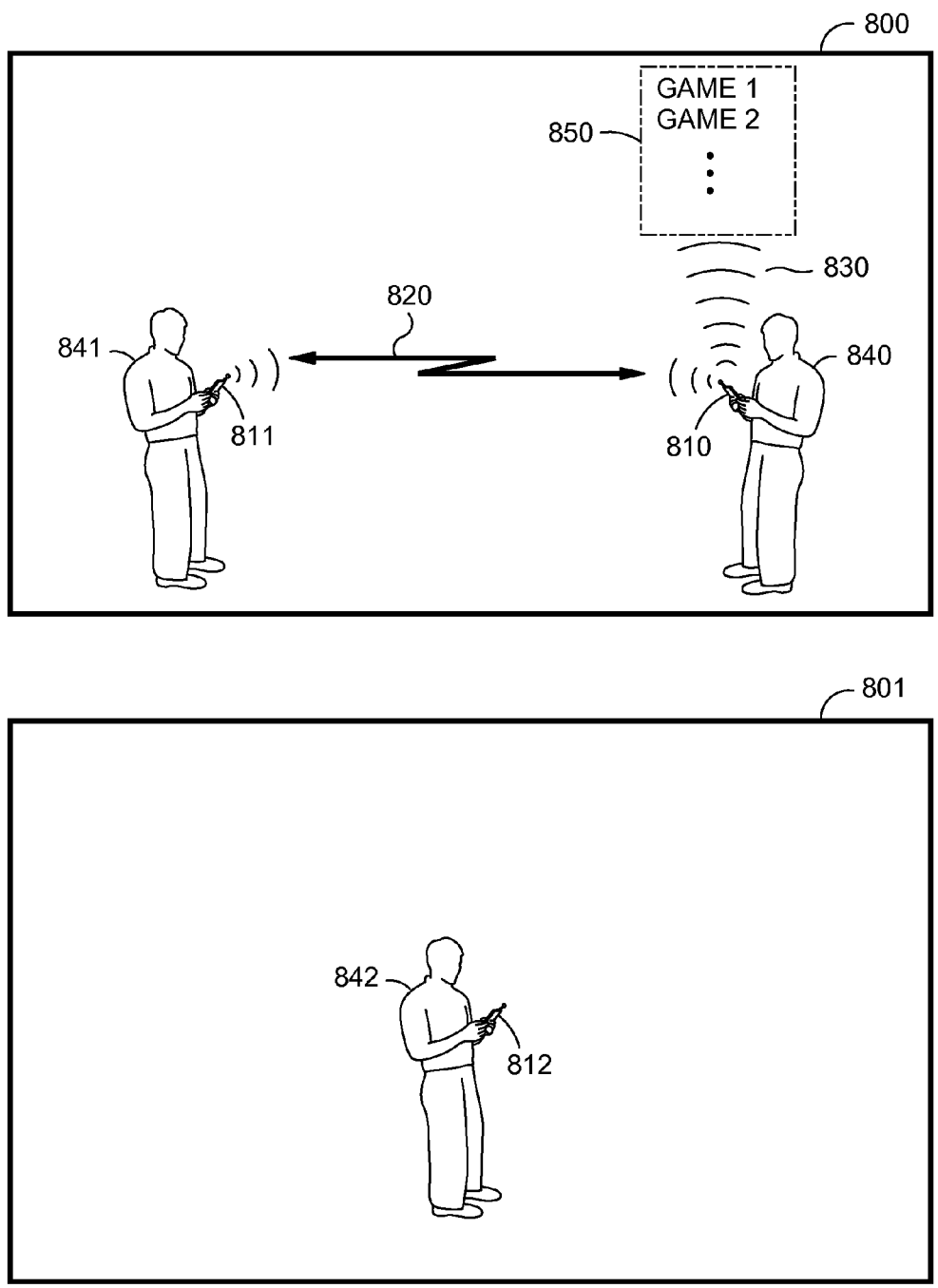
FIG. 8 is a network diagram depicting wireless devices in a wireless coverage area, configured for providing a game service, in accordance with a fifth embodiment of the invention.

FIG. 8 is a network diagram depicting wireless devices in a wireless coverage area, configured for providing a game service, in accordance with a fifth embodiment of the invention. Wireless coverage areas 800 and 801 are similar to wireless coverage areas 100 and 101 shown in FIG. 1. The particular geographical location of wireless coverage areas 800 and 801 are defined by the transmission and reception ranges of the wireless devices within the wireless coverage area, such as wireless devices 810, 811, and 812. A typical wireless coverage area is a bus, building, store or the like.

Wireless devices 810, 811, and 812 are wireless devices similar to wireless devices 110, 111, and 112 shown in FIG. 1. Wireless network connection 820 is similar to wireless network connection 120 of FIG. 1. Beacon 830 is a WiFi beacon frame or a WiFi probe response frame. Because the transmission ranges of WiFi beacon frames and WiFi probe response frames are limited, beacon 830 may only be received by nearby wireless devices.

Users 840, 841, and 842 are users of an on-line game service, such as Xbox Liver™, or the like. The on-line game service allows users to play on-line games with each other. Users 840, 841, and 842 have each stored a copy of their on-line game profile onto wireless devices 810, 811, and 812 respectively. Neither user 840, 841, nor 842 is logged onto the Internet. The game profiles of users 840, 841, and 842, such as game profile 850, list the games each user can play and information for each game. Users 840, 841, and 842 may play games on wireless devices 810, 811, and 812, respectively.

In this embodiment, the proximity of users is determined by the presence of users within a WiFi coverage area, such as wireless coverage areas 800 and 801. Users 840 and 841 are nearby since they are in the same wireless coverage area, namely wireless coverage area 800. User 842 is not near users 840 and 841 since user 842 is in another wireless coverage area, namely wireless coverage area 801.

User 840 advertises game profile 850, stored on wireless device 810, by continuously broadcasting beacon 830, which contains game profile 850 in an information element. User 840 may either advertise all the information in game profile 850 or some of the information in game profile 850. Because wireless device 811 is within the same wireless coverage area as wireless device 810, namely wireless coverage area 800, wireless device 811 receives beacon 830 containing game profile 850. Because wireless device 812 is not within wireless coverage area 800, wireless device 812 does not receive game profile 850. Therefore, user 842 does not discover user 840's presence.

Upon receiving beacon 830, wireless device 811 extracts game profile 850 from beacon 830, and determines a match between game profile 850 and user 841's stored game profile. Wireless device 811 determines a match by comparing the games listed in game profile 850 with the games listed in user 841's game profile. If there is a match, wireless device 811 displays a match indicator, such as a text message, an icon, a list of matching games, or the like. Upon noticing the match indicator, user 841 may create a wireless network connection, such as wireless network connection 820, between wireless devices 810 and 811 so that users 840 and 841 can exchange additional information, start a chat session, or start a game session. After a game session is complete, users 840 and 841 can store any changes to their game profiles, as a result of the game session, onto devices 810 and 811, respectively, for uploading to the on-line gaming service when they are logged onto the Internet.

Sixth Embodiment

Figure 9:
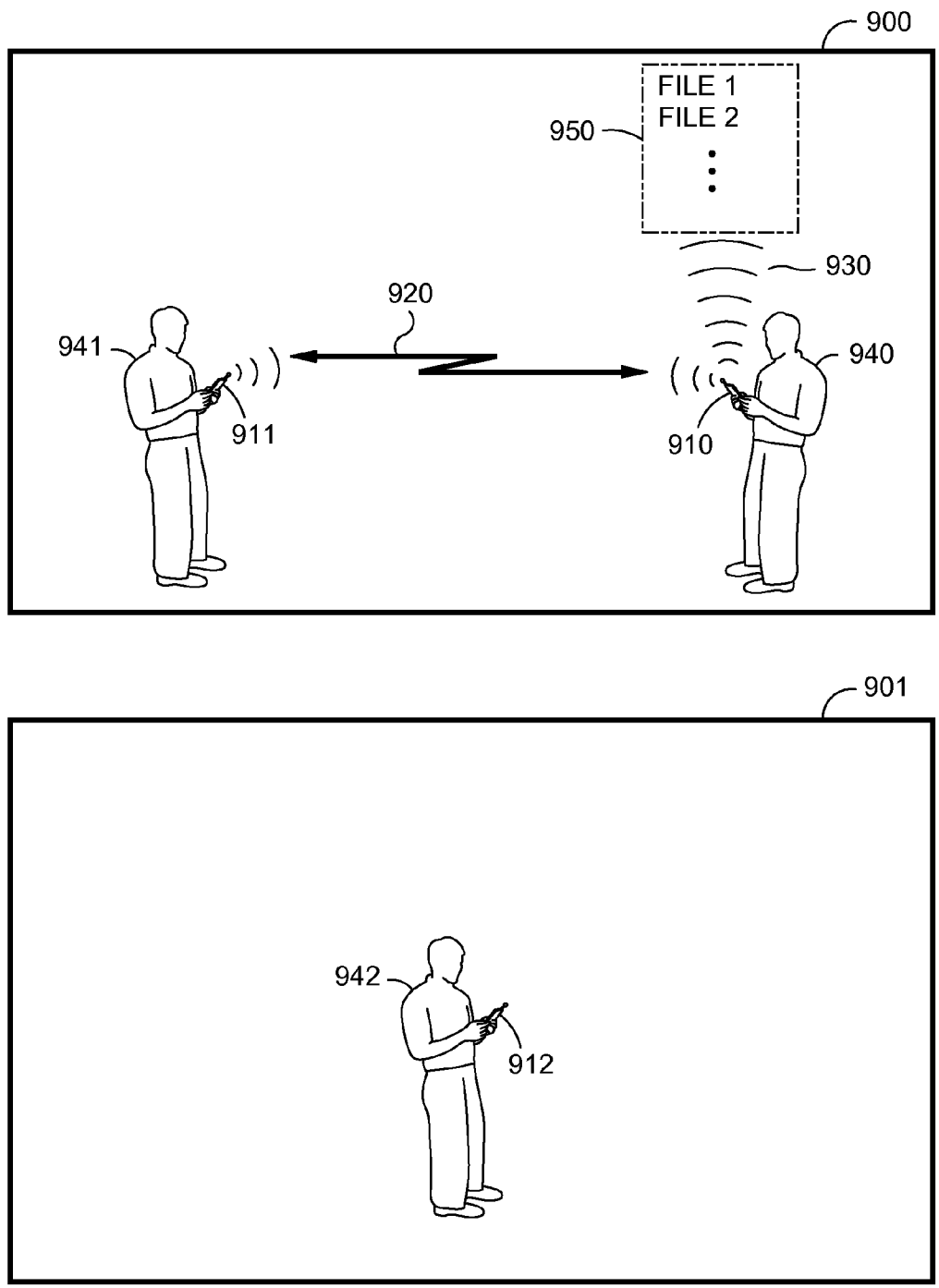
FIG. 9 is a network diagram depicting wireless devices in a wireless coverage area, configured for providing a media distribution service, in accordance with a sixth embodiment of the invention.

FIG. 9 is a network diagram depicting wireless devices in a wireless coverage area, configured for providing a media distribution service, in accordance with a sixth embodiment of the invention. Wireless coverage areas 900 and 901 are similar to wireless coverage areas 100 and 101 shown in FIG. 1. The particular geographical location of wireless coverage areas 900 and 901 are defined by the transmission and reception ranges of the wireless devices within the wireless coverage area, such as wireless devices 910, 911, and 912. A typical wireless coverage area is a bus, building, store or the like.

Wireless devices 910, 911, and 912 are wireless devices similar to wireless devices 110, 111, and 112 shown in FIG. 1. Wireless network connection 920 is similar to wireless network connection 120 of FIG. 1. Beacon 930 is a WiFi beacon frame or a WiFi probe response frame. Because the transmission ranges of WiFi beacon frames and WiFi probe response frames are limited, beacon 930 may only be received by nearby wireless devices.

Users 940, 941, and 942 are users of an on-line media distribution service, such as iTunes™, BitTorrent™, or the like. The on-line media distribution service allows users to download files. Users 940, 941, and 942 have each stored copies of their on-line media profiles onto wireless devices 910, 911, and 912 respectively. The media profiles of users 940, 941, and 942, such as media profile 950, list the files available for download from a user's wireless device and the files a user wants to download from another user's wireless device. Neither user 940, 941, nor 942 is logged onto the Internet.

In this embodiment, the proximity of users is determined by the presence of users within a WiFi coverage area, such as wireless coverage areas 900 and 901. Users 940 and 941 are nearby since they are in the same wireless coverage area, namely wireless coverage area 900. User 942 is not near users 940 and 941 since user 942 is in another wireless coverage area, namely wireless coverage area 901.

User 940 advertises media profile 950, stored on wireless device 910, by continuously broadcasting beacon 930, which contains the stored media profile in an information element. User 940 may either advertise all the information in media profile 950 or some of the information in media profile 950. Because wireless device 911 is within the same wireless coverage area as wireless device 910, namely wireless coverage area 900, wireless device 911 receives beacon 930 containing media profile 950. Because wireless device 912 is not within wireless coverage area 900, wireless device 912 does not receive media profile 950. Therefore, user 942 does not discover user 940's presence.

Upon receiving beacon 930, wireless device 911 extracts media profile 950 from beacon 930, and determines a match between media profile 950 and user 941's stored media profile. Wireless device 911 determines a match by comparing the files listed in media profile 950 with the files listed in user 941's media profile. If either user's media profile lists files available for download that the other user wants to download, there is a match. If there is a match, wireless device 911 displays a match indicator, such as a text message, an icon, a list of files available for download from another user, a list of files another user wants to download, or the like. Upon noticing the match indicator, user 941 may create a wireless network connection, such as wireless network connection 920, between wireless devices 910 and 911 so that users 940 and 941 can exchange additional information, start a chat session, or exchange files.

While the invention has been particularly shown and described with respect to a preferred embodiment thereof, it will be understood by those skilled in the art that changes in form and details may be made therein without departing from the scope and spirit of the invention.

What is claimed is:

1. A method comprising:
   storing, by a first wireless device, a first profile, wherein the first profile is associated with an online service provider, and wherein the first profile comprises (i) an indication of a first one or more items that a first user of the first wireless device desires to buy, and (ii) a first user identification that the first user uses to access the online service provider;
   receiving, over a wireless local area network (WLAN) and by the first wireless device, a WLAN beacon from a second wireless device, wherein each of the first wireless device and the second wireless device is connected to the same WLAN, wherein the beacon comprises a second profile associated with the online service provider, wherein the second profile comprises (i) an indication of a second one or more items that a second user of the second wireless device desires to sell, and (ii) a second user identification that the second user uses to access the online service provider;
   extracting, by the first wireless device, the second profile from the received WLAN beacon;
   comparing, by the first wireless device, the first profile and the second profile;
   in response to comparing the first profile and the second profile, determining, by the first wireless device, that an indication of a first item is included in each of (i) the indication of the first one or more items from the first profile and (ii) the indication of the second one or more items from the second profile;
   displaying, by the first wireless device, a match indicator to the first user;
   after displaying the match indicator and in response to a first user action, accessing, by the first wireless device, the online service provider using the first user identification;
   while accessing the online service provider, identifying the second user using the second user identification included in the extracted second profile; and
   based on identifying the second user, completing, by the first wireless device, a transaction via the online service provider to buy the first item from the second user.

2. The method of claim 1, further comprising:
   in response to determining that the indication of the first item is included in each of (i) the indication of the first one or more items from the first profile and (ii) the indication of the second one or more items from the second profile, communicating, by the first wireless device, with the second wireless device to exchange information associated with the first item.

3. The method of claim 1, further comprising:
   in response to determining that the indication of the first item is included in each of (i) the indication of the first one or more items from the first profile and (ii) the indication of the second one or more items from the second profile, informing, by the first wireless device and via the second wireless device, the second user a desire of the first user to buy the first item from the second user.

4. The method of claim 1, wherein receiving, by the first wireless device, the second profile from the second wireless device further comprises:
  establishing a local area network between the first wireless device and the second wireless device; and
  receiving, by the first wireless device and over the local area network, the second profile from the second wireless device.

5. The method of claim 1, wherein receiving, by the first wireless device, the second profile from the second wireless device further comprises:
  receiving, by the first wireless device and over a WiFi connection, the second profile from the second wireless device.

6. The method of claim 1, wherein receiving, by the first wireless device, the second profile from the second wireless device further comprises:
  receiving, by the first wireless device, a beacon from the second wireless device, wherein the beacon includes the second profile; and
  extracting, by the first wireless device, the second profile from the beacon.

7. The method of claim 1, wherein displaying the match indicator further comprises:
  displaying, by the first wireless device, the match indicator to the first user of the first wireless device, to enable the first user of the first wireless device to meet the second user in person.

8. The method of claim 1, further comprising:
  in response to determining that the indication of the first item is included in each of (i) the indication of the first one or more items from the first profile and (ii) the indication of the second one or more items from the second profile, transmitting, by the first wireless device, information to the second wireless device, wherein the information transmitted to the second wireless device enables the second wireless device or the second user to identify the first user.

9. The method of claim 1, wherein the first user of the first wireless device accesses the online service provider using one of (i) the first wireless device or (ii) a computing device that is different from the first wireless device.

10. The method of claim 1, wherein the first user of the first wireless device accesses the online service provider via the Internet.

11. An apparatus comprising:
  a processor;
  and a computer-readable storage medium, wherein instructions are tangibly stored on the computer-readable storage medium, wherein the instructions are executable by the processor to enable the processor to
    store a first profile associated with an online service provider, wherein the first profile comprises (i) an indication of a first one or more items that a first user of the apparatus desires to buy, and (ii) a first user identification that the first user uses to access the online service provider,
    receive, over a wireless local area network (WLAN), a WLAN beacon from a wireless device connected to the same WLAN as the apparatus, wherein the WLAN beacon comprises a second profile associated with the online service provider, wherein the second profile comprises (i) an indication of a second one or more items that a second user of the wireless device desires to sell, and (ii) a second user identification that the second user uses while accessing the online service provider,
    extract the second profile from the received beacon,
    compare the first profile and the second profile,
    in response to comparing the first profile and the second profile, determine that an indication of a first item is included in each of (i) the indication of the first one or more items from the first profile and (ii) the indication of the second one or more items from the second profile,
    display a match indicator to the first user,
    after displaying the match indicator and in response to a first user action, access the online service provider using first user identification,
    while accessing the online service provider, identify the second user using the second user identification included in the second profile that is received by the apparatus, and
    based on identifying the second user, complete a transaction via the online service provider to buy the first item from the second user.

12. The apparatus of claim 11, wherein the instructions are executable by the processor to further enable the processor to:
  in response to determining that the indication of the first item is included in each of (i) the indication of the first one or more items from the first profile and (ii) the indication of the second one or more items from the second profile, communicate with the wireless device to exchange information associated with the first item.

13. The apparatus of claim 11, wherein the instructions are executable by the processor to further enable the processor to:
  in response to determining that the indication of the first item is included in each of (i) the indication of the first one or more items from the first profile and (ii) the indication of the second one or more items from the second profile, inform, via the wireless device, the second user a desire of the first user to buy the first item from the second user.

14. The apparatus of claim 11, wherein receiving the second profile from the wireless device further comprises:
  establishing a local area network between the apparatus and the wireless device; and
  receiving, by the apparatus and over the local area network, the second profile from the wireless device.

15. The apparatus of claim 11, wherein receiving the second profile from the wireless device further comprises:
  receiving, by the apparatus and over a WiFi connection, the second profile from the wireless device.

16. The apparatus of claim 11, wherein receiving, by the apparatus, the second profile from the wireless device further comprises:
  receiving a beacon from the wireless device, wherein the beacon includes the second profile; and
  extracting the second profile from the beacon.

17. The apparatus of claim 11, wherein the instructions are executable by the processor to further enable the processor to:
  in response to determining that the indication of the first item is included in each of (i) the indication of the first one or more items from the first profile and (ii) the indication of the second one or more items from the second profile, transmit information to the wireless device, wherein the information transmitted to the wireless device enables the wireless device or the second user to identify the first user.

18. The apparatus of claim 11, wherein the first user accesses the online service provider using one of (i) the apparatus or (ii) a computing device that is different from the apparatus.

19. The apparatus of claim 11, wherein the first user accesses the online service provider via the Internet.

20. A method comprising:
- storing, by a first wireless device, a first profile associated with an online service provider, wherein the first profile comprises (i) an indication of a first one or more items that a first user of the first wireless device desires to buy, and (ii) a first user identification that the first user uses to access the online service provider;
- receiving, over a wireless local area network (WLAN) and by the first wireless device, a WLAN beacon from a second wireless device connected to the same WLAN as the first wireless device;
- extracting, by the first wireless device, a second profile from the WLAN beacon, wherein the second profile is associated with the online service provider, wherein the second profile comprises (i) an indication of a second one or more items that a second user of the second wireless device desires to sell, and (ii) a second user identification that the second user uses while accessing the online service provider;
- determining, by the first wireless device, that an indication of a first item is included in each of (i) the indication of the first one or more items from the first profile and (ii) the indication of the second one or more items from the second profile;
- displaying, by the first wireless device, a match indicator to the first user;
- after displaying the match indicator and in response to a first user action, accessing, by the first wireless device, the online service provider using the first user identification;
- while accessing the online service provider, identifying the second user using the second user identification included in the second profile that is received by the first wireless device; and
- based on identifying the second user, completing a transaction via the online service provider to buy the first item from the second user.

\* \* \* \* \*